G. W. Lee,
Feed Cutter.
No. 89,669. Patented May 4, 1869.
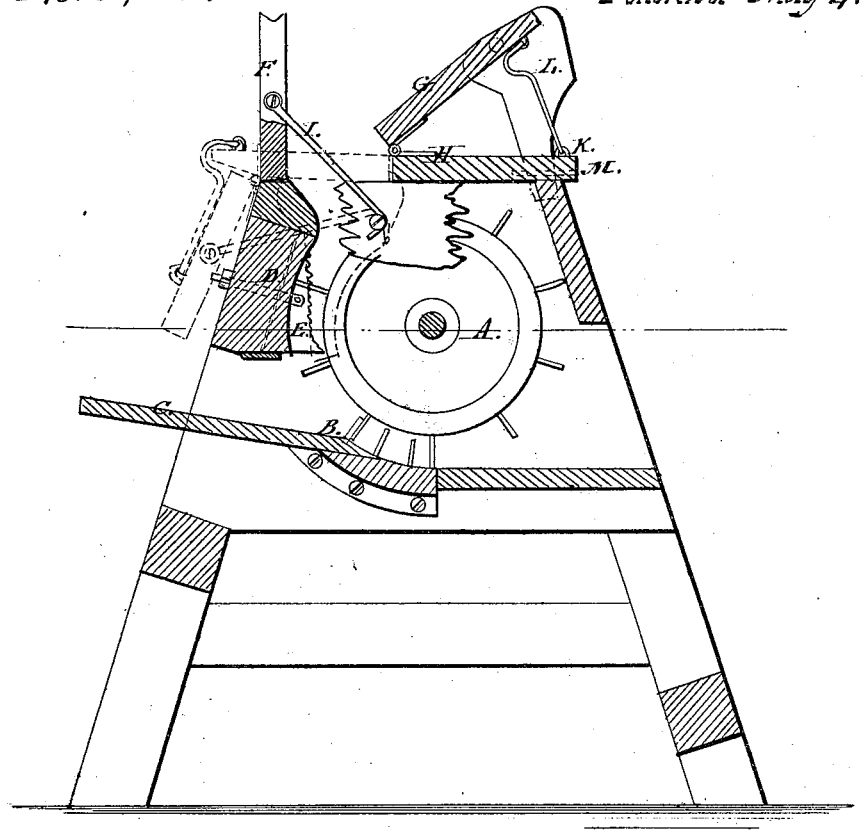
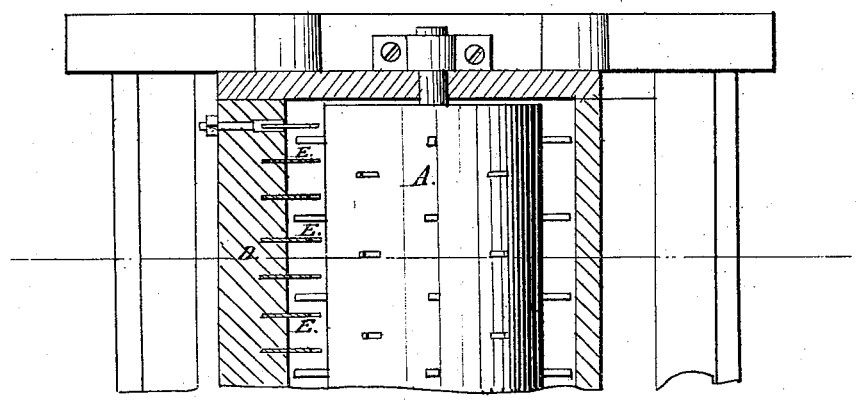
Witnesses:
Chas. Nila
John F. Brooke
Inventor: G. W. Lee.
Munn & Co.
Attorneys.

United States Patent Office.

GEORGE W. LEE, OF SANDY, OHIO.

Letters Patent No. 89,669, dated May 4, 1869.

IMPROVEMENT IN FEED-CUTTING ATTACHMENT FOR THRESHING-MACHINES.

The Schedule referred to in these Letters Patent and making part of the same.

*To all whom it may concern:*

Be it known that I, GEORGE W. LEE, of Sandy, in the county of Columbiana, and State of Ohio, have invented a new and improved Feed-Cutting Attachment for Threshing-Machines; and I do hereby declare that the following is a full, clear, and exact description thereof, which will enable others skilled in the art to make and use the same, reference being had to the accompanying drawings, forming part of this specification.

This invention relates to improvements in feed-cutting apparatus, designed to provide a simple, cheap, and effective apparatus, adapted for attachment to threshing-machines, and operation in combination therewith, to accomplish the work faster and in a better manner than can be done by cutting-apparatus now in use.

Figure 1 represents a sectional elevation of a threshing-apparatus provided with my attachment.

Figure 2 represents a plan view of the same.

Similar letters of reference indicate corresponding parts.

A represents the ordinary threshing-cylinder, and B, the concave shell thereof, provided with spikes.

C represents the feeding-table to be employed when threshing.

D represents a concave attachment, provided with a series of saws E, arranged vertically in the face thereof, which, in connection with the spikes of the cylinder, are designed for cutting the corn-stalks or other substance into short lengths, previous to being carried down to be acted on both by the spikes of the cylinder and those of the shell B, whereby it is broken into fine particles.

To form a hopper to facilitate the feeding of the material to be cut, I provide the aprons F and G, the former hinged to the part D, and the latter hinged to the fixed portion H of the casing of the cylinder.

When the machine is to be used for cutting feed, these aprons are adjusted to the positions represented in the drawing, and secured there by the hooks I K, and the plate L, which is pivoted to the end of the apron G, and rests at its lower end in a staple, M, shown in dotted lines.

When the machine is to be used for threshing, these aprons are adjusted to the positions shown in red, closing the opening into the top of the apparatus, where the material to be cut is placed transversely, and the plate L folds down, closing an opening in one end of the casing, to permit the substance being cut to project, as is sometimes necessary, when longer than the breadth of the machine.

By this arrangement I am enabled to provide a cheap and simple feed-cutting attachment, which may be either permanently or detachably connected to the threshing-machine, and the breaking-devices of the latter utilized to facilitate the preparation of the feed, the saws, together with the spikes of the cylinder, serving to cut the straw or corn-stalks into short pieces, and the said cylinder-spikes in the casing finish the operation by breaking the said pieces into fine particles.

I consider the arrangement of the saws E, in combination with the spiked cylinder, an important feature of my invention, as by it the substance is severed more easily, while a more important advantage thereof is the action of the saws upon the severed ends, which leaves the fibre in a soft and broken condition which does not injure the animals in eating, whereas when cut smoothly, especially corn-stalks, the substance of which is hard and compact, sharp points are formed, which are very injurious to the mouths of the animals, and often require straining before it is safe to feed them.

Having thus described my invention,

I claim as new, and desire to secure by Letters Patent—

1. The combination, with the toothed cylinder and toothed shell of a threshing-machine, of the attachment D, provided with saws, and either permanently or detachably connected thereto, substantially as specified.

2. The aprons F G, combined with the attachment D, and the casing H, and arranged substantially as specified.

3. The plate L, combined with the apron G, the casing H, and attachment D, when arranged substantially as specified.

GEO. W. LEE.

Witnesses:
JOSHUA LEE,
S. A. T. LEE.